March 5, 1929.  J. B. DANIEL  1,704,313
PRUNING SHEARS
Filed July 17, 1926
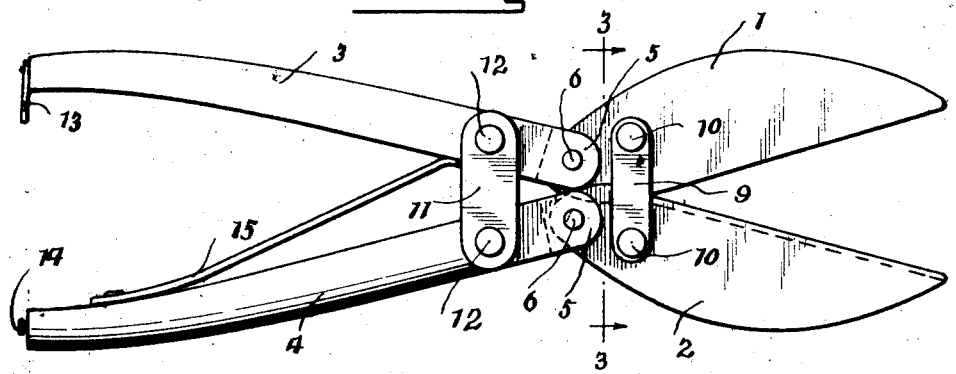
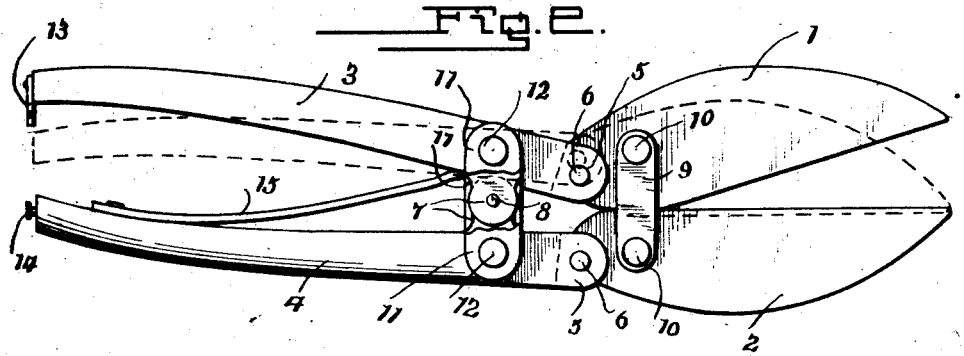
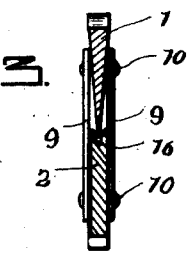
Inventor
J. B. Daniel.
By Lacey & Lacey, Attorneys Patented Mar. 5, 1929.

1,704,313

UNITED STATES PATENT OFFICE.

JOHN B. DANIEL, OF TEXICO, NEW MEXICO.

PRUNING SHEARS.

Application filed July 17, 1926. Serial No. 123,161.

This invention relates to pruning shears and one object of the invention is to provide a pair of shears with which shrubbery and small limbs of fruit trees may be easily trimmed.

Another object of the invention is to so mount companion jaws of the shears that they will have longitudinal as well as transverse movement relative to each other and cause their cutting edges to have shearing engagement with a limb or twig to be cut.

Another object of the invention is to permit a reciprocating motion to be imparted to the blades or jaws after they are engaged with a limb or twig to be cut and thereby cause the blades to slice through the limb or twig if it cannot be cut by the usual pressure applied to the handles of the shears.

The invention is illustrated in the accompanying drawing, wherein

Figure 1 is a view showing the improved shears in side elevation with the jaws or blades open;

Fig. 2 is a view similar to Fig. 1 showing the jaws partially closed and indicated fully closed by dotted lines;

Fig. 3 is a transverse sectional view taken through the blades or jaws on the line 3—3 of Fig. 1.

The shears constituting the subject-matter of this invention consists of companion jaws or blades 1 and 2 from the rear ends of which extend handles 3 and 4. Each handle is provided at its forward end with a fork 5 within which the rear end portion of the respective blade 1 or 2 fits and rivets 6 are passed through the forks and blades to pivotally connect the companion blades and handles. It will, therefore, be seen that the blades and handles may have swinging movement transversely of each other when the blades are opened or shut. Cooperating hinge ears 7 extend from the inner faces of the handles in spaced relation to their forward ends, and these ears are formed with alined openings to receive a pivot pin 8 about which the ears turn when the handles are moved to open or close the jaws. Fulcrum strips 9 are disposed at opposite sides of the blades, and these fulcrum strips extend transversely of the blades with their end portions overlapping them and pivotally connected therewith by rivets or other suitable fasteners 10. By an inspection of Fig. 2, it will be readily seen that, when the handles are moved towards or away from each other to close or open the jaws, the handles will swing about the pivot pin 8 and the jaws or blades will have pivotal movement at their connections with the handles and also turn about the pins 10. Reinforcing plates 11 are disposed at opposite sides of the hinge ears 7 with their end portions overlapping the side faces of the handles and secured thereto by pins or rivets 12 about which the plates may turn when the handles are moved.

When the shears are in use, the latch 13 carried by one handle is released from the pin or keeper 14 extending from the rear end of the other handle and the spring 15 will cause the handles to be moved away from each other and the jaws or blades opened, as shown in Fig. 1. The shears are held with the handles grasped by one hand and the small tree limb or other article to be cut is disposed between the adjacent inner edges of the blades. When pressure is applied to the handles, the handle 4 is first swung about the pin 8 so that its forward end moves away from the forward end of the handle 3 and the blade 2 will be swung about the pin 10 connecting the fulcrum strips 9 with it until it is disposed in axial alinement with its handle, as shown in Fig. 2, instead of extending in diverging relation thereto, as shown in Fig. 1. Continued pressure upon the handles will then cause the handle 3 to swing about the pivot 8 and the blade 1 will be swung about the fulcrum from the full line position shown in Fig. 2 to the closed position indicated by dotted lines. While swinging from the full line to the dotted line position of Fig. 2, the inner sharpened edge of the blade 1 slides longitudinally of the grooved inner edge of the blade 2 and, therefore, a shearing action will take place which will cause the blade 1 to readily cut through the tree limb. Since the blade 2 has its inner edge formed with a groove 16, the inner edges of the two blades may overlap and the sharpened edge of the blade 1 will be guarded and prevented from being knicked or otherwise dulled when the shears are not in use. If the sharpened edge of the blade 2 does not readily cut through the tree limb when pressure is applied to the handles to force the two blades toward each other, a rocking action may be applied to the handles so that they swing about the pins 6 which connect them to the blades and reciprocating motion will be transmitted to the blades so that they slide longitudinally of each other and a slicing action will take place which will cause the blade 2 to readily cut its way through the limb. It will thus be seen that, under ordinary conditions, a small tree limb or shrubbery may be cut by a shearing action or a slicing action may be applied to an extra tough or thick limb which it is desired to remove. As soon as pressure upon the handles is released, the spring 15 will operate to return the handles to their normal position and open the blades so that the tree limb may be released if it has become wedged between the blades and other limbs or twigs cut.

Having thus described the invention, I claim:

A pruning implement comprising similar blades having straight opposed edges and having arcuate rear ends in rolling engagement, fulcrum strips disposed transversely of the blades adjacent the rear ends thereof and pivoted thereto, and handles pivoted to the rear ends of the blades and provided with pivotally connected ears on their opposed sides adjacent the ends of the blades.

In testimony whereof I affix my signature.

JOHN B. DANIEL. [L. s.]